(12) United States Patent
Aizaki

(10) Patent No.: US 9,977,253 B2
(45) Date of Patent: May 22, 2018

(54) BIREFRINGENT ELEMENT UNIT AND PROJECTING DEVICE

(71) Applicant: JVC KENWOOD Corporation, Yokohama-shi, Kanagawa (JP)

(72) Inventor: Takatsugu Aizaki, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days. days.

(21) Appl. No.: 15/262,223

(22) Filed: Sep. 12, 2016

(65) Prior Publication Data

US 2017/0082913 A1 Mar. 23, 2017

(30) Foreign Application Priority Data

Sep. 18, 2015 (JP) .................................. 2015-185355

(51) Int. Cl.

| | |
|---|---|
| *G03B 21/14* | (2006.01) |
| *G02B 27/48* | (2006.01) |
| *G02B 5/30* | (2006.01) |
| *G03B 21/20* | (2006.01) |
| *G02B 27/28* | (2006.01) |
| *G02B 5/02* | (2006.01) |

(52) U.S. Cl.
CPC ........... *G02B 27/48* (2013.01); *G02B 5/3083* (2013.01); *G02B 27/283* (2013.01); *G02B 27/286* (2013.01); *G03B 21/208* (2013.01); *G03B 21/2033* (2013.01); *G03B 21/2073* (2013.01); *G02B 5/0278* (2013.01)

(58) Field of Classification Search
CPC ............ G03B 21/2033; G03B 21/2053; G03B 21/2073; G03B 21/14; G02B 27/283; G02B 27/286; G02B 5/3083; G02B 27/48
See application file for complete search history.

(56) References Cited

U.S. PATENT DOCUMENTS

| | | | | |
|---|---|---|---|---|
| 4,088,400 | A * | 5/1978 | Assouline | ......... G02F 1/133528 349/102 |
| 6,163,402 | A * | 12/2000 | Chou | ................... G03B 21/604 353/74 |
| 6,515,798 | B1 * | 2/2003 | Chou | ................... G03B 21/604 359/443 |
| 7,489,436 | B1 * | 2/2009 | Fiorentino | ................ G02F 1/39 359/326 |

(Continued)

FOREIGN PATENT DOCUMENTS

JP 2011-158543 8/2011

*Primary Examiner* — Bao-Luan Le
(74) *Attorney, Agent, or Firm* — Amin, Turocy & Watson LLP

(57) ABSTRACT

An optical device according to an embodiment includes a first birefringent element on which coherent incident light is incident, a transmissive diffusing element on which light emitted from the first birefringent element is incident, and a second birefringent element on which light emitted from the transmissive diffusing element is incident. Light emitted by a laser light source is incident on the first birefringent element and the incident light is separated into two lights by birefringence to be incident on the diffusing element. The diffusing element diffuses the two lights to emit. The second birefringent element synthesizes the two lights emitted from the diffusing element into one light to emit.

7 Claims, 9 Drawing Sheets

(56) References Cited

U.S. PATENT DOCUMENTS

| | | | | |
|---|---|---|---|---|
| 8,109,638 B2* | 2/2012 | Chen | ................ | G02B 27/48 |
| | | | | 348/744 |
| 8,998,421 B2* | 4/2015 | Akiyama | ............. | G02B 27/283 |
| | | | | 349/5 |
| 9,500,937 B2* | 11/2016 | Tanaka | ................ | G03B 21/204 |
| 9,500,941 B2* | 11/2016 | Akiyama | ............. | G03B 21/208 |
| 2007/0047600 A1* | 3/2007 | Luo | ................ | H01S 3/0627 |
| | | | | 372/21 |
| 2007/0153235 A1* | 7/2007 | Morikawa | ............. | G02F 1/0136 |
| | | | | 353/20 |
| 2009/0185141 A1* | 7/2009 | Chen | ................ | G02B 27/48 |
| | | | | 353/38 |
| 2013/0229628 A1* | 9/2013 | Akiyama | ............. | G02B 27/283 |
| | | | | 353/20 |
| 2014/0293232 A1* | 10/2014 | Tanaka | ................ | G03B 21/204 |
| | | | | 353/20 |
| 2015/0301438 A1* | 10/2015 | Akiyama | ............. | G03B 21/208 |
| | | | | 353/20 |

\* cited by examiner

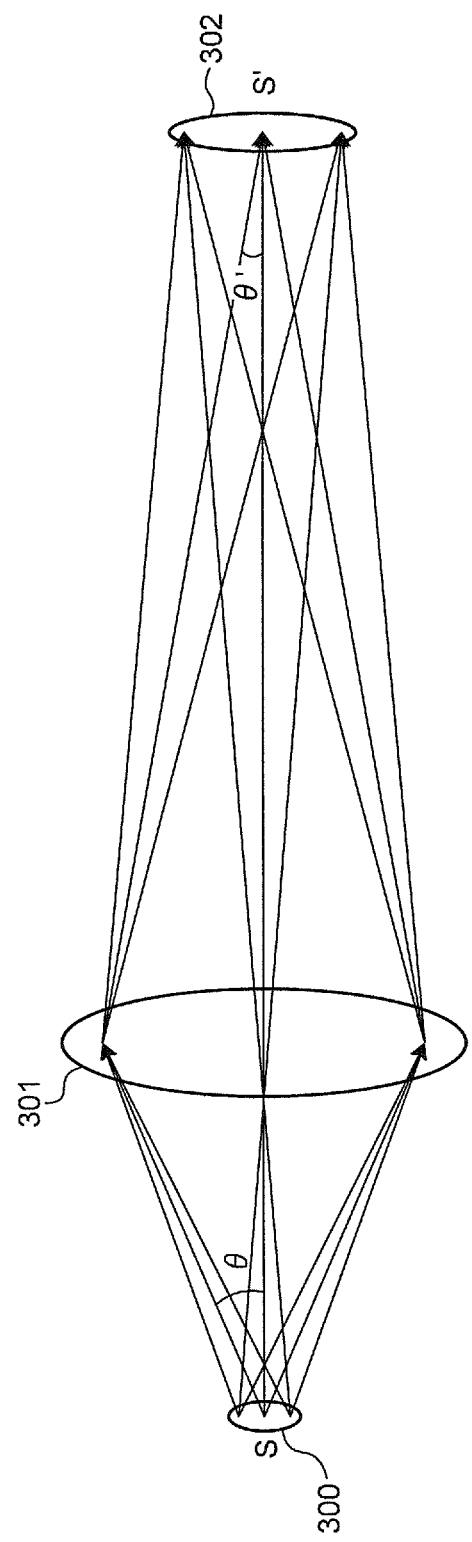

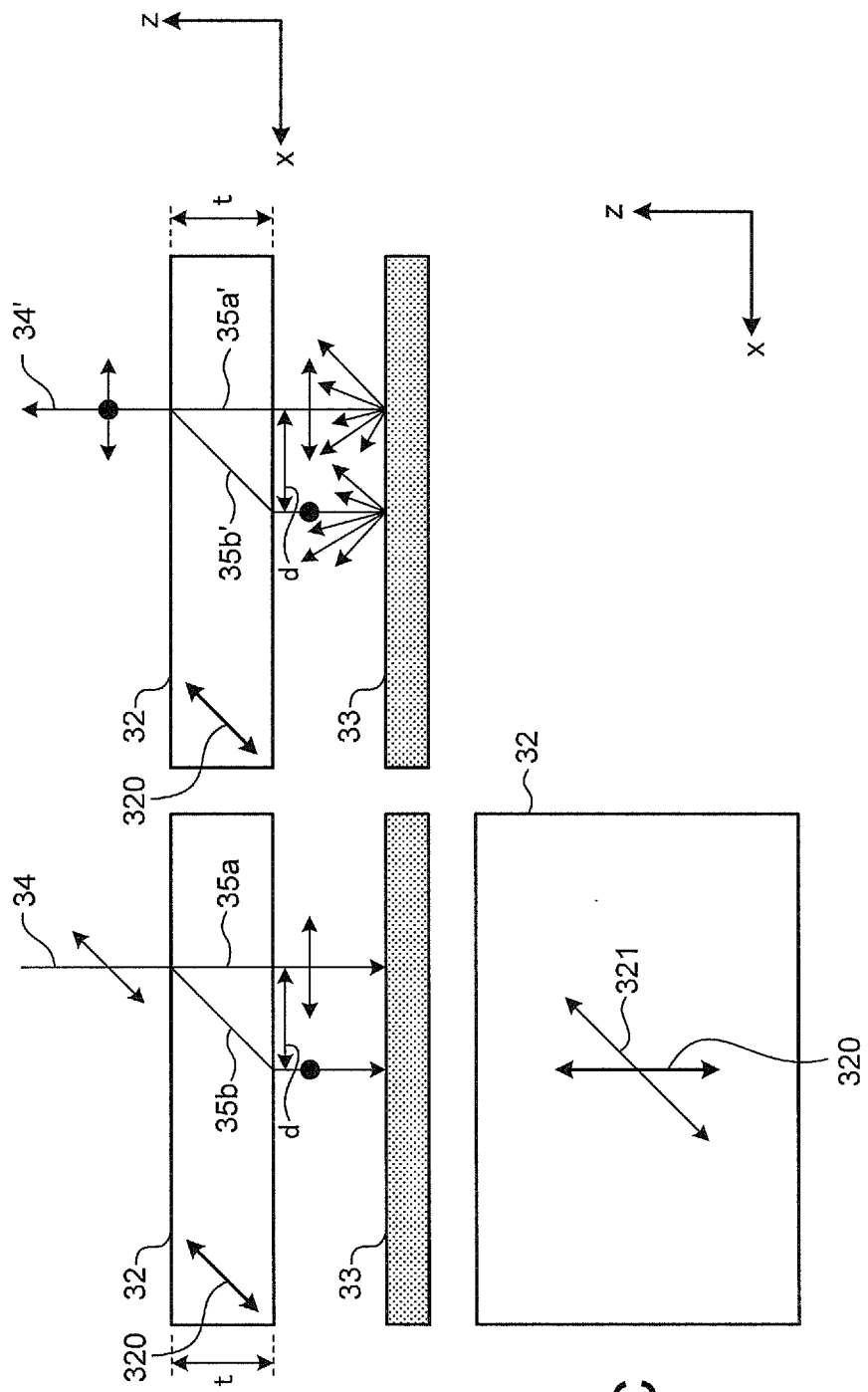

BIREFRINGENT ELEMENT UNIT AND PROJECTING DEVICE

CROSS-REFERENCE TO RELATED APPLICATION(S)

The present application claims priority to and incorporates by reference the entire contents of Japanese Patent Application No. 2015-185355 filed in Japan on Sep. 18, 2015.

BACKGROUND OF THE INVENTION

1. Field of the Invention

The present invention relates to an optical device and a projecting device.

2. Description of the Related Art

Recently, a laser light source is increasingly used as a light source which irradiates light to a light modulation element of a projecting device. The laser light source has various advantages of a long life, a wide color gamut, and high utilization efficiency of the light, as compared to a conventional light source by a lamp such. In contrast, the light irradiated to the light modulation element preferably has uniform light intensity distribution on the light modulation element. However, when a light flux of a plurality of laser lights is generated by using a laser diode array and the like, for example, and the light flux is irradiated to the light modulation element, an uneven pattern called as a speckle pattern might be generated on a projection image due to high coherence of the laser light.

Therefore, conventionally, a diffusing element or the like is inserted between the laser light source and the light modulation element to diffuse the laser light, thereby moderating the coherence of the laser light. Japanese Patent Application Laid-open No. 2011-158543 (heireinafter called "the patent document 1") discloses technology of decreasing a spatial frequency of the laser light by obtaining an effect of a low-pass filter by separating the light into two lights by a birefringent element and further using the diffusing element to inhibit the speckle pattern.

However, the conventional technology has a problem that sufficient illumination uniformity on the light modulation element cannot be realized. For example, in a method of using the diffusing element, new noise might be generated by diffraction and interference caused by a structure of the diffusing element itself.

On the other hand, in the method of using the birefringent element and the diffusing element disclosed in the patent document 1, it is possible to inhibit unnecessary pattern by superimposing diffusion patterns by the diffusing element of light source images separated by the birefringent element. However, the light of the light source is separated into a plurality of lights by the birefringent element in this method, so that a plurality of light source images is seen in a subsequent optical system and efficiency of the light of the light source passing through the optical system is problematically deteriorated.

SUMMARY OF THE INVENTION

It is an object of the present invention to at least partially solve the problems in the conventional technology.

According to the present disclosure, there is provided an optical device comprising: a first birefringent element on which coherent incident light is incident; a transmissive diffusing element on which light emitted from the first birefringent element is incident; and a second birefringent element on which light emitted from the transmissive diffusing element is incident.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a view illustrating an illuminating system in a simplified manner;

FIG. 9A is a view schematically illustrating light which passes through an optical device according to the second embodiment with reference to a cross-sectional view on a plane parallel to incident light of a birefringent element.

FIG. 9B is a view schematically illustrating light which passes through an optical device according to the second embodiment with reference to a cross-sectional view on a plane parallel to incident light of a birefringent element.

FIG. 9C is a view schematically illustrating a top view of a birefringent element as seen in a direction of incident light.

DETAILED DESCRIPTION OF THE PREFERRED EMBODIMENTS

Preferred embodiments of an optical device and a projecting device are hereinafter described in detail with reference to the attached drawings. Specific numeric values and appearance configurations described in the embodiments are merely examples for facilitating the understanding of the present invention and are not intended to limit the present invention unless especially noted so. Meanwhile, detailed description and illustration of elements which are not directly related to the present invention are omitted.

In the optical device according to each embodiment of the present invention, laser light emitted from a light source is separated into an ordinary beam and an extraordinary beam by a birefringent element which causes birefringence of light and the separated ordinary beam and extraordinary beam are diffused by a diffusing unit. The diffused ordinary beam and extraordinary beam are incident on the birefringent element again to be synthesized into one beam. The synthesized light is incident on an optical projection system to irradiate a light modulation element.

Since the optical device according to each embodiment has the above-described configuration, the laser light is separated into a plurality of lights to be diffused and illumination uniformity of emission light is improved, thereby generation of a speckle pattern is reduced. Furthermore, since a plurality of separated lights is synthesized into one light, deterioration in efficiency is inhibited.

Herein, the birefringence is schematically described. A crystal having a birefringent property has a property with the birefringent property for a beam traveling in a specific direction but without the birefringent property for a beam traveling in other directions; the specific direction is referred to as an optical axis.

Figure 1A:
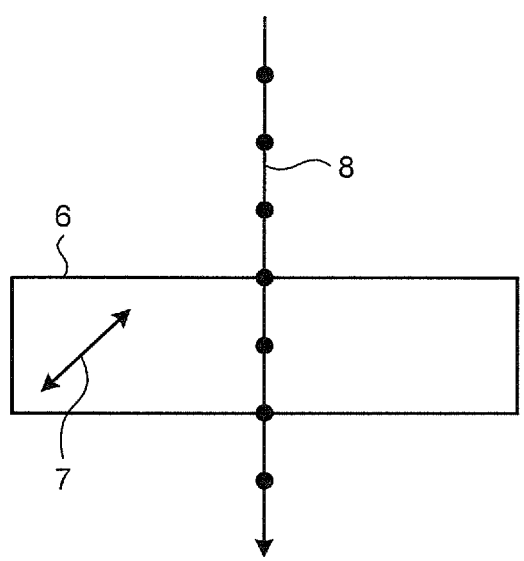
FIG. 1A is a view schematically illustrating a state in which light passes through a crystal having a birefringent property.
Figure 1B:
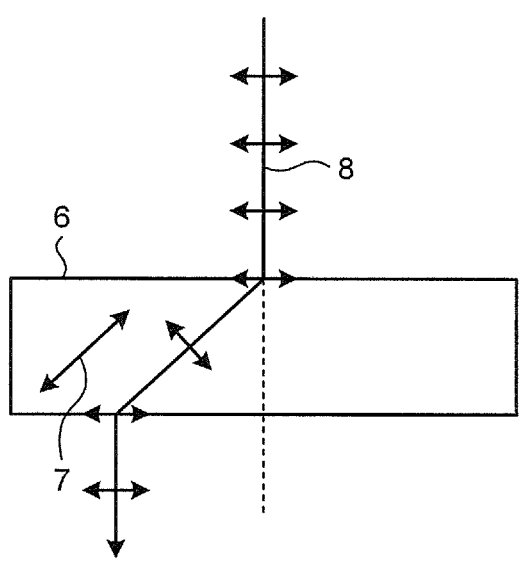
FIG. 1B is a view schematically illustrating a state in which light passes through a crystal having a birefringent property.

FIG. 1 schematically illustrates a state in which light 7 passes through a crystal 6 having the birefringent property. The crystal 6 has a nature to separate a beam 8 in a direction not parallel to the optical axis 7 into the ordinary beam and extraordinary beam in different optical paths. The ordinary beam is polarized light perpendicular to the optical axis 7 (refer to FIG. 1A) and the extraordinary beam is polarized light perpendicular to the ordinary beam (refer to FIG. 1B). A refraction index and a beam speed are different between the ordinary beam and extraordinary beam. Meanwhile, in FIGS. 1A and 1B, "● (black circle)" and a left right arrow perpendicularly intersecting with the optical path indicate linear polarized lights with different polarization directions.

For example, in an example in FIGS. 1A and 1B, the crystal 6 having the birefringent property is configured such that an angle between the optical axis 7 and an incident direction of incident light to the crystal is not 0 degree. Herein, an example in which the incident light is perpendicularly incident on an incident surface of the crystal 6 is described. When the light 8 is perpendicularly incident on the incident surface of the crystal 6, the ordinary beam travels in the same direction as that of the incident light, that is to say, in the direction perpendicular to the incident surface of the crystal 6 as illustrated in FIG. 1A. On the other hand, the extraordinary beam obliquely travels in a plane parallel to the optical axis 7 to be emitted at a position different from an emission position of the ordinary beam on an emission surface as illustrated in FIG. 1B.

First Embodiment

Figure 2:
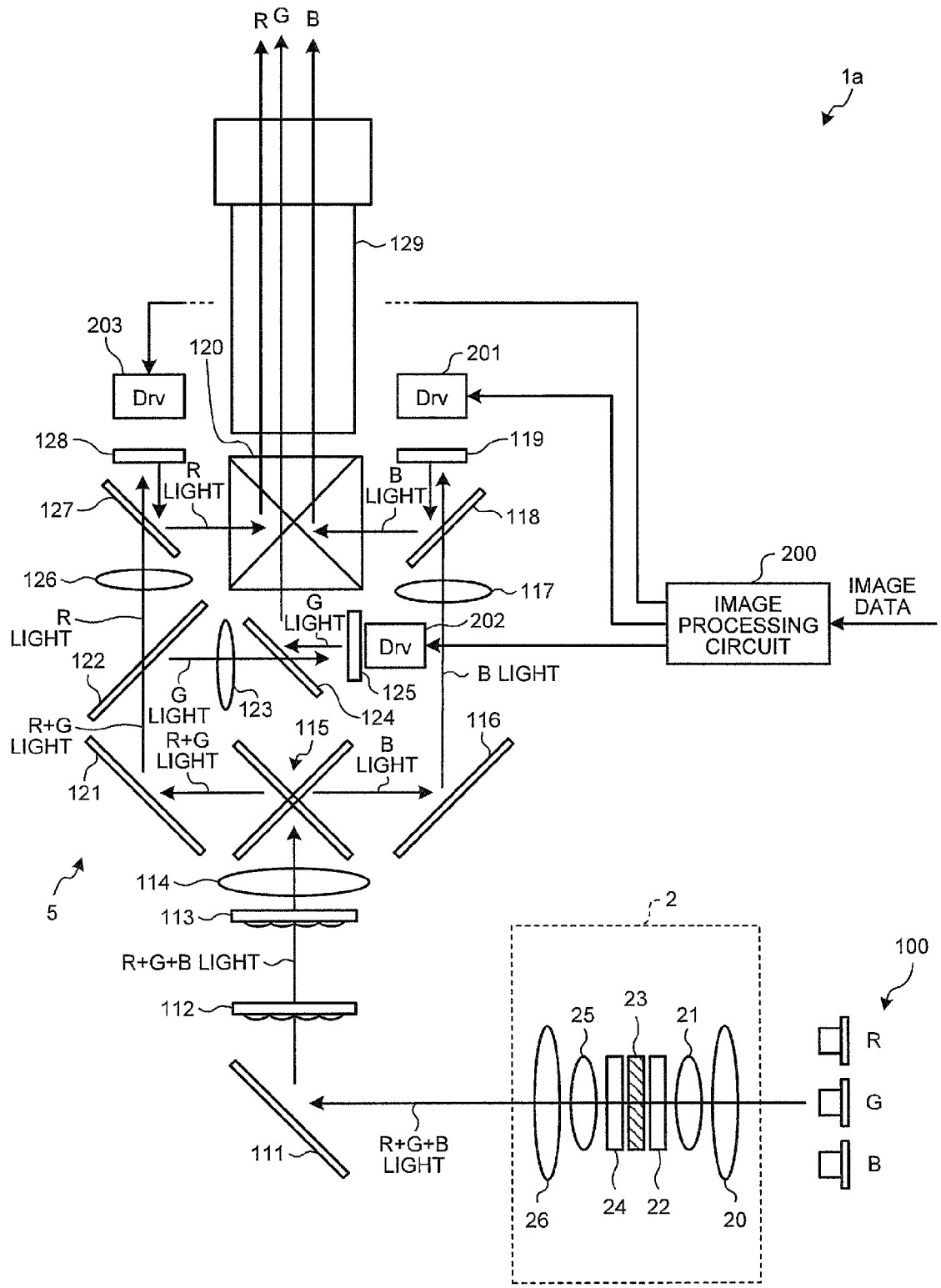
FIG. 2 is a view illustrating a configuration of an example of a projecting device applicable to the first embodiment.

FIG. 2 illustrates a configuration of an example of a projecting device applicable to a first embodiment. In FIG. 2, a projecting device 1a includes an optical device 2, a light source 100, an illumination optical system 5, and a projecting lens 129 according to the first embodiment. Furthermore, the projecting device 1a includes an image processing circuit 200, light modulation elements 128, 125, and 119 for R (red), G (green), and B (blue) colors, respectively, a light synthesizing prism 120, and driving circuits 201, 202, and 203 for driving the light modulation elements 119, 125, and 128, respectively, depending on outputs of the image processing circuit 200.

In FIG. 2, the light source 100 includes a R light source which emits R laser light, a G light source which emits G laser light, and a B light source which emits B laser light, for example. For example, the R light source obtained by assembling a plurality of laser elements is a laser diode array, for example. In this case, the R light source may be regarded as a spot light source. The same applies to the G light source and B light source.

The R, G, and B laser lights emitted from the light source 100 are incident on the optical device 2 according to the first embodiment where illuminance uniformity thereof is improved as described later to be emitted. The R, G, and B laser lights emitted from the optical device 2 are irradiated to a mirror 111 such that directions thereof are changed. Meanwhile, the mirror 111 may be omitted depending on a layout of the projecting device 1a. Hereinafter, the R, G, and B laser lights are appropriately referred to as R light, G light, and B light, respectively.

The R light, G light, and B light emitted from the mirror 111 are incident on a lens 114 through fly-eye lenses 112 and 113. The fly-eye lenses 112 and 113 form a uniform illumination optical system which disperses the R light, G light, and B light such that they are uniformly irradiated to the light modulation elements 128, 125, and 119, respectively, when they are irradiated to the light modulation elements 128, 125, and 119 described later.

The R light, G light, and B light are emitted from the lens 114 to be incident on a light separator 115 which separates the R light and G light from the B light. The light separator 115 includes a first dichroic mirror which reflects light of a wavelength band of the B light and transmits lights of the wavelength bands of the R light and G light, and a second dichroic mirror which reflects the lights of the wavelength bands of the R light and G light and transmits the light of the wavelength band of the B light, for example. The B light separated by the light separator 115 is emitted from the light separator 115 to be incident on a mirror 116. The R light and G light separated by the light separator 115 are emitted from the light separator 115 to be incident on a mirror 121.

The B light incident on the mirror 116 is incident on a reflective polarization plate 118 through a lens 117. The reflective polarization plate 118 transmits one of S-polarized light and P-polarized light and reflects the other. Herein, suppose that the B light emitted from the lens 117 is the P-polarized light, the light reflected by the light modulation element 119 described later is the S-polarized light, and the reflective polarization plate 118 has a property of transmitting the P-polarized light and reflecting the S-polarized light.

The B light transmitted through the reflective polarization plate 118 is incident on the light modulation element 119. The light modulation element 119 is driven by the driving circuit 201 described later according to an image signal of B color to modulate and reflect the incident B light on a pixel-to-pixel basis according to an image signal of B color to emit. A reflective liquid crystal element may be applied, for example, as the light modulation element 119. The element applicable as the light modulation element 119 is not limited to the reflective liquid crystal element. For example, it is also possible to apply a DMD (digital mirror device) as the light modulation element 119. Meanwhile, when the DMD is applied as the light modulation element 119, a configuration of the illumination optical system 5 is appropriately changed.

The B light modulated by the light modulation element 119 on a pixel-to-pixel basis according to the image signal of B color is reflected by the reflective polarization plate 118 such that the direction thereof is changed and is emitted to be incident on a first surface of the light synthesizing prism 120.

The R light and G light separated by the light separator 115 to be incident on the mirror 121 are reflected by the mirror 121 such that the directions thereof are changed and are incident on a color component separator 122 to be separated into the R light and G light. For example, the color component separator 122 is formed of a dichroic mirror which reflects the light of the wavelength band of the G light and transmits the light of the wavelength band of the R light.

The G light separated by the color component separator 122 is incident on a reflective polarization plate 124 through a lens 123. As with the above-described B light, the G light is the P-polarized light and is transmitted through the reflective polarization plate 124 to be incident on a light modulation element 125. The light modulation element 125 is driven by the driving circuit 202 described later according to an image signal of G color to modulate and reflect the incident G light on a pixel-to-pixel basis according to the image signal of G color to emit. The G light emitted from the light modulation element 125 is reflected by the reflective polarization plate 124 to be incident on a second surface of the light synthesizing prism 120.

The R light separated by the color component separator 122 is incident on a reflective polarization plate 127 through a lens 126. As with the above-described B light, the R light is the P-polarized light and is transmitted through the reflective polarization plate 127 to be incident on the light modulation element 128. The light modulation element 128 is driven by the driving circuit 203 described later according to an image signal of R color to modulate and reflect the incident R light on a pixel-to-pixel basis according to the image signal of R color to emit. The R light emitted from the light modulation element 128 is reflected by the reflective polarization plate 127 to be incident on a third surface of the light synthesizing prism 120.

The light synthesizing prism 120 synthesizes the B light, G light, and R light incident on the first, second, and third surfaces, respectively, to emit from a fourth surface as a light flux. The light flux including the R light, G light, and B light emitted from the light synthesizing prism 120 is emitted outside through the projecting lens 129 including a plurality of lenses.

Image data of an image which is intended to be projected by the projecting device 1a, for example, is input to the image processing circuit 200. The image processing circuit 200 applies predetermined image processing to the input image data and generates the driving signals of R, G, and B colors for driving the light modulation elements 128, 125, and 119, respectively. The driving signals of R, G, and B colors are supplied to the driving circuits 203, 202, and 201, respectively. The driving circuits 203, 202, and 201 drive the light modulation elements 128, 125, and 119 according to the supplied driving signals of R, G, and B colors, respectively. According to this, a projection image according to the image data is projected.

Detail of Optical Device According to First Embodiment

Next, the optical device 2 according to the first embodiment is described in more detail with reference to FIG. 2. The optical device 2 includes a plurality of lenses 20, 21, 25, and 26, two birefringent elements 22 and 24, and a transmissive diffusing element 23 which diffuses the transmitted light. Meanwhile, hereinafter, the birefringent elements 22 and 24 are referred to as the first and second birefringent elements 22 and 24, respectively.

Out of a plurality of lenses 20, 21, 25, and 26, the lens 20 is a condenser lens which condenses the laser lights of the respective colors from the light source 100. Each of the first and second birefringent elements 22 and 24 separates the incident light into the ordinary beam and extraordinary beam with different polarization directions by birefringence to emit. As described later, the first birefringent element 22, the diffusing element 23, and the second birefringent element 24 form a despeckler for reducing generation of speckles by the laser light.

The laser light as coherent light incident on the optical device 2 is incident on the first birefringent element 22 through the lenses 20 and 21 and is separated into the ordinary beam and extraordinary beam by the first birefringent element 22 by the birefringence to be emitted. The beams by the ordinary beam and extraordinary beam are incident on the second birefringent element 24 through the diffusing element 23. The second birefringent element 24 is arranged such that a crystal axis direction thereof is in predetermined relationship with that of the first birefringent element 22 and synthesizes the beams by the ordinary beam and extraordinary beam emitted from the first birefringent element 22 into one beam to emit.

The laser lights of the respective colors synthesized into the one beam by the second birefringent element 24 is emitted from the second birefringent element 24 to be emitted from the optical device 2 through the lenses 25 and 26.

Figure 3:
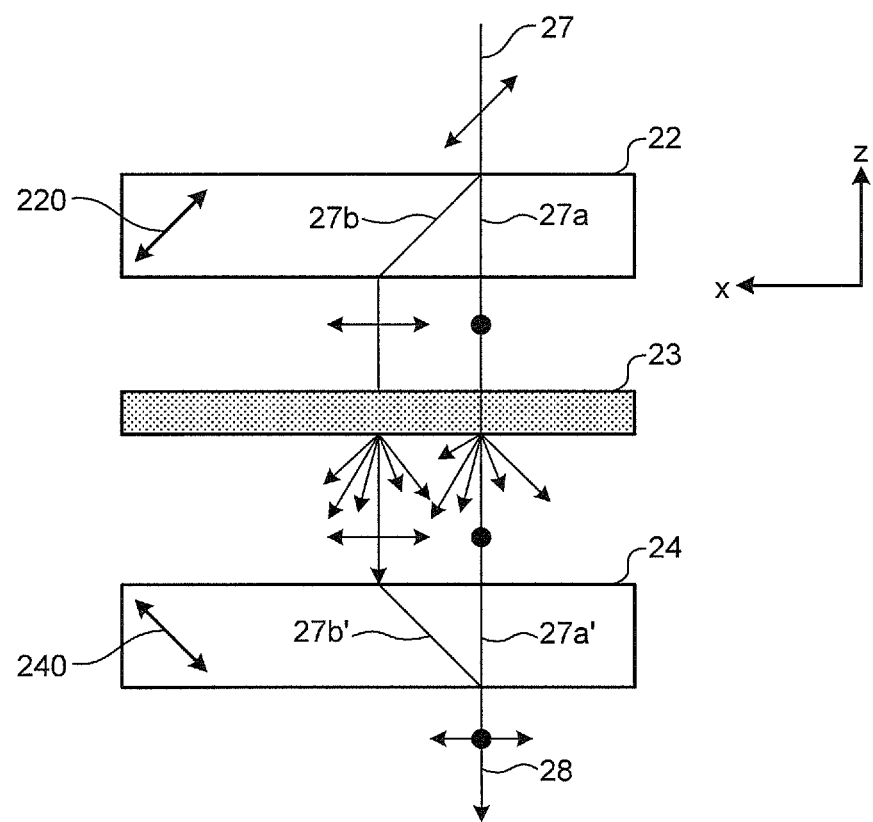
FIG. 3 is a view schematically illustrating light which passes through an optical device according to the first embodiment.

FIG. 3 schematically illustrates the light passing through the optical device according to the first embodiment. Meanwhile, in FIG. 3, "● (black circle)" and a left right arrow perpendicularly intersecting with an optical path indicate linear polarized light with different polarization directions and a left right arrow obliquely intersecting with the optical path indicates polarizzed light in an arbitrary direction.

In FIG. 3, the first and second birefringent elements 22 and 24 forming the optical device according to the first embodiment are arranged and the diffusing element 23 is arranged between the first and second birefringent elements 22 and 24.

Each of the first and second birefringent elements 22 and 24 separates the incident beam into two beams of the ordinary beam and extraordinary beam with different polarization directions on an interface on an incident side. The extraordinary beam travels in a predetermined crystal axis direction of the birefringent element, for example. Hereinafter, a predetermined crystal axis direction of the birefringent element is described as an optical axis unless otherwise noted especially.

Calcite and crystal may be used, for example, as the first and second birefringent elements 22 and 24. However, the material of the first and second birefringent elements 22 and 24 is not limited thereto. The first and second birefringent may also be formed of other material as long as the material has a property of generating the birefringence. The first and second birefringent elements 22 and 24 which have the same property in refraction indexes of the ordinary beam and extraordinary beam as well as thickness of the elements are used.

More specifically, the first birefringent element 22 separates incident light 27 incident with an arbitrary polarization direction into an ordinary beam 27a and an extraordinary beam 27b with different polarization directions. Hereinafter, suppose that the first birefringent element 22 is configured to be arranged such that the ordinary beam 27a travels through the first birefringent element 22 in the same direction as a traveling direction of the incident light 27. On the other hand, the extraordinary beam 27b travels through the first birefringent element 22 according to an optical axis 220 of the first birefringent element 22.

The beams by the ordinary beam 27a and extraordinary beam 27b emitted from the first birefringent element 22 are incident on the second birefringent element 24 through the diffusing element 23.

The second birefringent element 24 has a property of separating the incident light into the ordinary beam and extraordinary beam by the birefringence as with the first birefringent element 22. In this regards, by arranging the second and first birefringent elements 24 and 22 such that the optical axes 240 and 220 thereof are in predetermined relationship, it is possible to synthesize the ordinary beam 27a and extraordinary beam 27b which are separated by the first birefringent element 22 to be incident on the second birefringent element 24 into the one beam in the second birefringent element 24.

In the first embodiment, the first and second birefringent elements 22 and 24 are arranged so as to satisfy the following condition. That is to say, in the first embodiment, the first and second birefringent elements 22 and 24 are arranged such that the optical axis 220 of the first birefringent element 22 and the optical axis 240 of the second birefringent element 24 are mirror-symmetrical. In this case, the optical axes 220 and 240 are mirror-symmetrical with respect to an emission surface of the first birefringent element 22 or an incident surface of the second birefringent element 24 as a plane of mirror symmetry supposing that the emission surface of the first birefringent element 22 from which the incident light 27 is emitted is in contact with the incident surface of the second birefringent element 24 on which the beam emitted from the diffusing element 23 is incident. In the first embodiment, as illustrated in FIG. 3, the first and second birefringent elements 22 and 24 are arranged such that the optical axes 220 and 240 are optically mirror-symmetrical.

That is to say, it is sufficient that the optical axis 220 of the first birefringent element 22 and the optical axis 240 of the second birefringent element 24 are in relationship such that two lights emitted from the first birefringent element 22 to be incident on the second birefringent element 24 are synthesized into one light in the same optical path when passing through the second birefringent element 24 to be emitted.

Thus, the extraordinary beam 27b of the first birefringent element 22 travels in the second birefringent element 24 as an extraordinary beam 27b' in a direction mirror-symmetrical to the traveling direction of the extraordinary beam 27b in the first birefringent element 22 by the birefringence. The extraordinary beam 27b' and an ordinary beam 27a', which is obtained by the birefringence in the second birefringent element 24 of the ordinary beam 27a in the first birefringent element 22 incident on the second birefringent element 24, are synthesized into one beam on an interface on an emission side of the second birefringent element 24 to be emitted from the second birefringent element 24 as emission light 28.

Meanwhile, herein, suppose that the first and second birefringent elements 22 and 24 are arranged such that each of a refraction angle of the ordinary beam 27a and a refraction angle of the ordinary beam 27a' is 0 degree. Suppose that the first and second birefringent elements 22 and 24 are arranged such that the emission surface of the first birefringent element 22 and the incident surface of the second birefringent element 24 are parallel to each other, for example (refer to FIG. 3).

Herein, according to the configuration of the first embodiment, the beams by the ordinary beam 27a and extraordinary beam 27b emitted from the first birefringent element 22 are diffused by the diffusing element 23 to be incident on the second birefringent element 24. In FIG. 3, the ordinary beam 27a' in the second birefringent element 24 is formed of a component a traveling direction of which is substantially the same as that of the beam incident on the diffusing element 23 out of the components of diffused light obtained by diffusing the ordinary beam 27a by the diffusing element 23. Similarly, the extraordinary beam 27b' in the second birefringent element 24 is formed of a component a traveling direction of which is substantially the same as that of the beam incident on the diffusing element 23 out of the components of diffused light obtained by diffusing the extraordinary beam 27b by the diffusing element 23.

Although only the component the traveling direction of which is substantially the same as that of the beam incident on the diffusing element 23 is illustrated as the beam emitted from the diffusing element 23 for simplification in FIG. 3, beams, which are diffused by the diffusing element 23 and the traveling directions of which are changed, also travel in the same manner as the ordinary beam 27a' and extraordinary beam 27b' according to the polarization direction thereof. Thus, this may be regarded as one spot light source as seen from in an emission side of the diffusing element 23.

According to the configuration of the optical device according to the first embodiment, angular distribution of the emission light 28 is obtained by superimposing angular distribution of the laser light as the incident light 27 on angular distributions of the diffused lights of the ordinary light 27a and the extraordinary light 27b at two points on a diffusing surface of the diffusing element 23. Therefore, the optical device 2 serves as the despeckler for reducing the speckles of the emission light 28 as compared to the incident light 27 to improve the illumination uniformity. The emission light 28 is emitted as the one beam, so that deterioration in illumination efficiency is inhibited.

Figure 4:
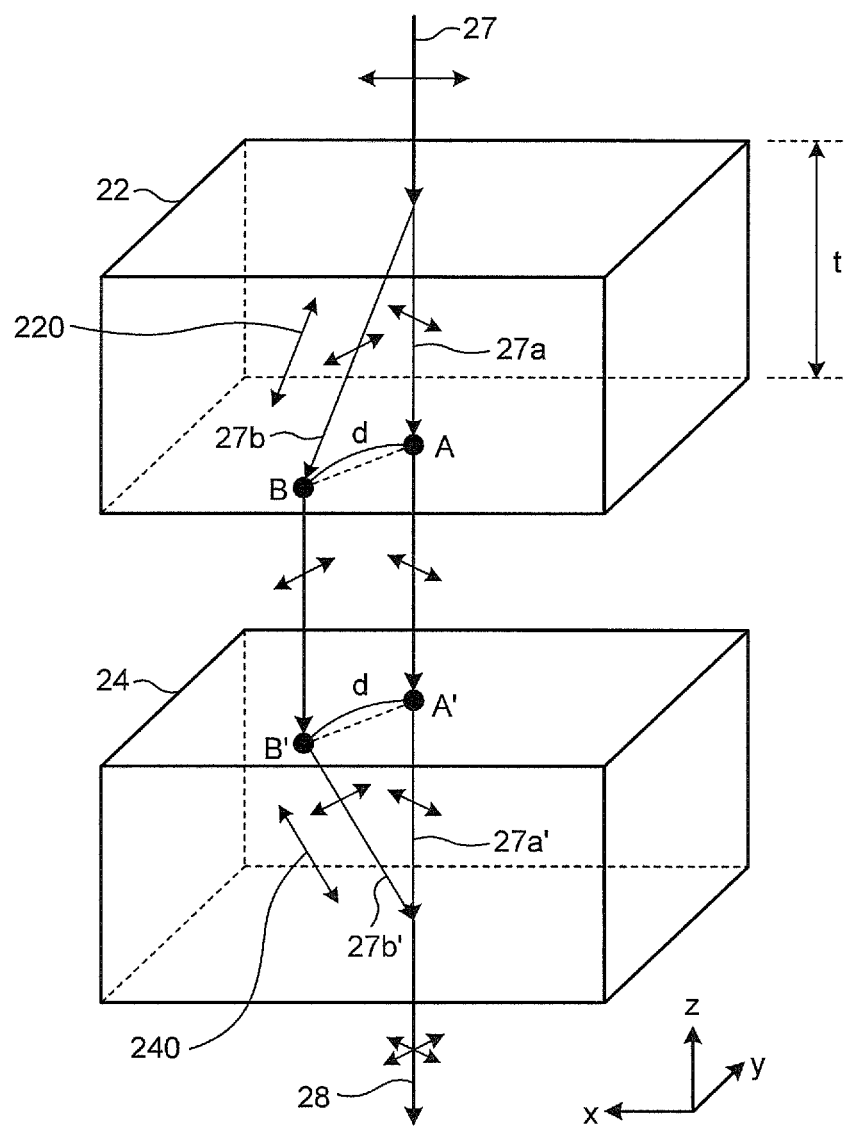
FIG. 4 is a perspective view illustrating an example of arrangement of first and second birefringent elements according to the first embodiment.
Figure 5A:
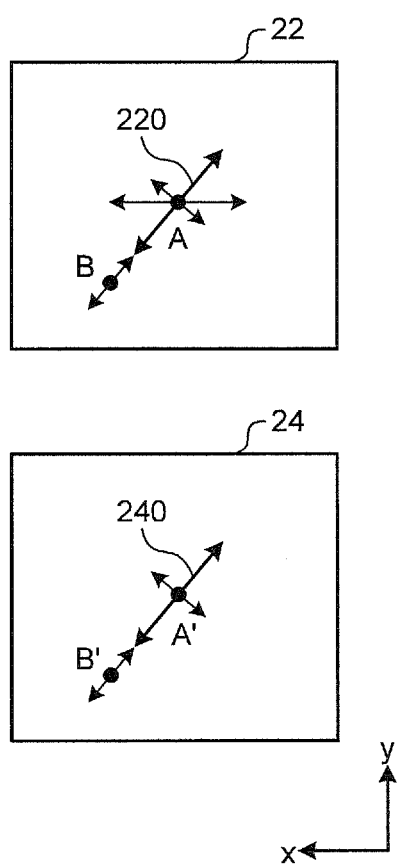
FIG. 5A is a top view of an example of the first and second birefringent elements according to the first embodiment.
Figure 5B:
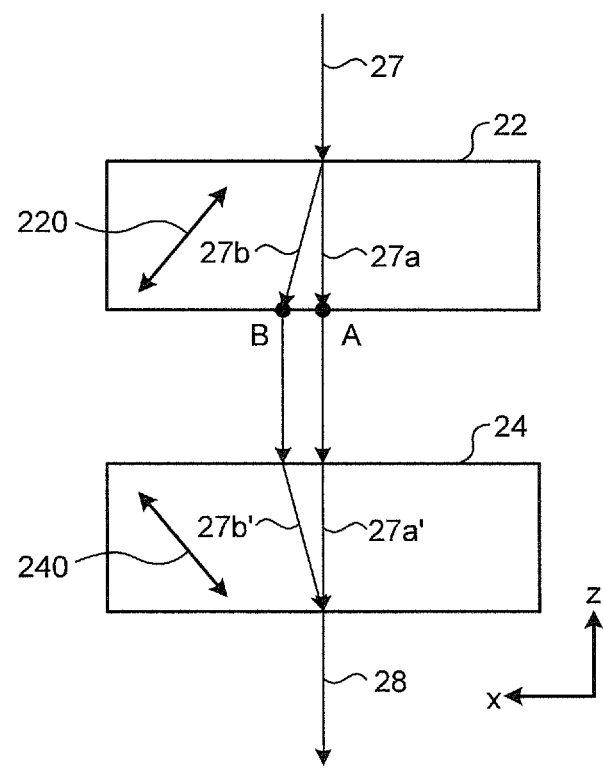
FIG. 5B is a front view of an example of the first and second birefringent elements according to the first embodiment.

The arrangement of the first and second birefringent elements 22 and 24 according to the first embodiment is described in more detail with reference to FIGS. 4 and 5. FIG. 4 is a perspective view illustrating an example of the arrangement of the first and second birefringent elements 22 and 24 according to the first embodiment. FIG. 5A is a top view of the first and second birefringent elements 22 and 24 illustrated in FIG. 4 and FIG. 5B is a front view thereof. Meanwhile, in FIGS. 4 and 5, the diffusing element 23 is omitted. In FIGS. 4 and 5, the same reference numeral is assigned to the portion common to FIG. 3 above and the detailed description thereof is omitted.

In FIG. 4, a leftward (width) direction, an obliquely right upward (depth) direction, and an upward (height) direction are set to an x-axis, a y-axis, and a z-axis, respectively, and a lower right apex in the drawing is set to an origin point, and unit length is set to one for each of the first and second birefringent elements 22 and 24. In this case, suppose that the optical axis 220 of the first birefringent element 22 is in a direction connecting a coordinate (1, 0, 0) to a coordinate (0, 1, 1). The second birefringent element 24 is arranged such that the optical axis 240 and the optical axis 220 are mirror-symmetrical. In this case, the optical axis 240 is in a direction connecting a coordinate (1, 0, 1) to a coordinate (0, 1, 0) obtained by inverting relation between the optical axis 220 and the z-axis.

With reference to FIG. 4, suppose that the first and second birefringent elements 22 and 24 have thickness of t and the refraction indexes corresponding to the ordinary beam and extraordinary beam in the first and second birefringent elements 22 and 24 are refraction indexes $n_o$ and $n_e$, respectively. In this case, separation width d as difference between an emission position of the ordinary beam and an emission position of the extraordinary beam on the emission side of the first birefringent element 22 is represented by following equation (1).

$$d = t \times (n_o^2 - n_e^2)/(n_o^2 + n_e^2) \qquad (1)$$

The ordinary beam 27a and extraordinary beam 27b obtained by separating the incident light 27 by the first birefringent element 22 by the birefringence are emitted from the emission surface of the first birefringent element 22 in a direction perpendicular to the emission surface with the separation width d (positions A and B in the drawing). That is to say, a direction of the optical axis 220 corresponds to a direction of the extraordinary beam 27b which is separated from the ordinary beam 27a by the separation width d when traveling in the z axis by the thickness t. The ordinary beam 27a and the extraordinary beam 27b emitted from the first birefringent element 22 are incident on the second birefringent element 24 while maintaining the separation width d (positions A' and B' in the drawing).

Herein, when the first and second birefringent elements 22 and 24 are arranged such that the crystal axis directions thereof are in predetermined relationship, the extraordinary beam 27b' separated from the ordinary beam 27a' incident on the position B' of the second birefringent element 24 travels in a route in the second birefringent element 24 opposite to that of the extraordinary beam 27b in the first birefringent element 22 according to the optical axis 240. That is to say, a direction of the optical axis 240 corresponds to a direction of the extraordinary beam 27b' which approaches the ordinary beam 27a' by the same distance as the separation width d when traveling in the z axis by the thickness t. The extraordinary beam 27b' is synthesized with the ordinary beam 27a' based on the ordinary beam 27a emitted from the first birefringent element 22 on an interface on the emission side of the second birefringent element 24 to be emitted as the emission light 28.

Supposing that there is no diffusing element 23, a plane formed of the ordinary beam 27a and extraordinary beam 27b traveling through the first birefringent element 22 and a plane formed of the ordinary beam 27a' and extraordinary beam 27b' traveling through the second birefringent element 24 are parallel to each other. The ordinary beam 27a and extraordinary beam 27b traveling between the first and second birefringent elements 22 and 24 are parallel to the incident light 27.

Next, polarization of the beams is considered with reference to FIGS. 4 and 5. Hereinafter, the polarization direction connecting a coordinate $(x_1, y_1)$ to a coordinate $(x_2, y_2)$ is represented as $(x_1, y_1)$-$(x_2, y_2)$. With reference to FIG. 4, suppose that the incident light 27 is linearly polarized light the polarization direction of which is arbitrary. In this case, the ordinary beam 27a in the first birefringent element 22 becomes the linearly polarized light the polarization direction of which is (1, 1)-(0, 0) according to the optical axis 220 and the extraordinary beam 27b becomes the linearly polarized light the polarization direction of which is (1, 0)-(0, 1).

As described above, the optical axis 220 of the first birefringent element 22 and the optical axis 240 of the second birefringent element 24 are mirror-symmetrical, that is to say, in inversion relationship in the z-axis direction, and the direction on an xy plane is the same. Therefore, in the second birefringent element 24, the polarization direction of the ordinary beam 27a' is the same as the polarization direction of the ordinary beam 27a in the first birefringent element 22. Similarly, the polarization direction of the extraordinary beam 27b' is the same as the polarization direction of the extraordinary beam 27b in the first birefringent element 22. Therefore, the emission light 28 obtained by synthesizing the ordinary beam 27a' and the extraordinary beam 27b' emitted from the second birefringent element 24 is the beam including the two linearly polarized lights with different polarization directions. Thus, it becomes possible to sort the beams using the reflective polarization plates 118, 124, and 127 in FIG. 2, for example.

Meanwhile, a speckle pattern due to an irradiated position by irradiation of the coherent beam such as the laser light is different depending on the irradiated position. Therefore, it is sufficient that the separation width d between the first and second birefringent elements 22 and 24 is shifted from a cycle of the speckle pattern. For example, the separation width d is made larger than length of one cycle of the speckle pattern. As is understood from equation (1) described above, when the separation width d is determined, the thickness t of the first and second birefringent elements 22 and 24 is also determined. When the length of the one cycle of the speckle pattern is set to several μm to hundreds of μm, the thickness t of not smaller than 1 mm is sufficient, for example.

Herein, an effect of the first embodiment is described. FIG. 6 illustrates an illuminating system in a simplified manner. The light emitted from a light source 300 is condensed by a lens 301 to form a light source image on an irradiated surface 302. Herein, supposing that an emission angle of the light emitted from the light source 300 is an angle θ and an area of the light source 300 is an area S, and a case in which the light emitted from the light source 300 at the emission angle θ is irradiated to the irradiated surface 302 having an area S' at an irradiation angle θ' is considered. In the illuminating system, etendue which is a physical amount obtained by multiplying a cross-sectional area of the light flux by a solid angle determined by the light is defined. For example, the etendue on an emission side, that is to say, a light source 300 side and the etendue on an irradiated side, that is to say, an irradiated surface 302 side are represented by following equations (2) and (3), respectively.

$$\text{Emission side etendue} = \pi \times S \times \sin^2\theta \qquad (2)$$

$$\text{Irradiated side etendue} = \pi \times S' \times \sin^2\theta' \qquad (3)$$

In the illuminating system, when the etendue on the emission side is equal to the etendue on the irradiated side, highest illumination efficiency is realized. By taking equations (2) and (3) described above as an example, when relationship by following equation (4) is established, the highest illumination efficiency is realized.

$$\pi \times S \times \sin^2\theta = \pi \times S' \times \sin^2\theta' \qquad (4)$$

On the other hand, when the etendue on the emission side is larger than the etendue on the irradiated side, for example, a part of the light emitted from the emission side is not irradiated to the irradiated side and the illumination efficiency is deteriorated.

In a case of the projecting device 1a in FIG. 2, the irradiated surface 302 corresponds to the light modulation element 128 in the example of the R light and the light source 300 corresponds to the R light source included in the light source 100. The R light source is regarded to be the spot light source or the light source very similar to the spot light source and the area S and the emission angle θ take small values.

Herein, a case in which the second birefringent element 24 according to the first embodiment is not used is considered. In this case, the beams emitted from the positions A and B of the first birefringent element 22 are diffused by the diffusing element 23 to be emitted from the optical device 2.

That is to say, the incident light 27 incident on the first birefringent element 22 is emitted as two beams with different polarization directions. This means that there are two light sources 300 and the area of the light source 300 doubles.

If this case is applied to equation (4) described above, on a left side of the equation, the area S doubles. In this case, in order that equation (4) described above may be satisfied, it is required to make the area S' or the irradiation angle θ' larger. When equation (4) is not satisfied, that is to say, when the left side of equation (4) is larger than the right side, a part of the light emitted from the light source 300 is not irradiated to the irradiated surface 302 and the illumination efficiency is deteriorated. When one of the two beams the polarization directions of which are different from each other emitted from the light source 300 is not irradiated to the irradiated surface 302, for example, in the case of the R light source in FIG. 2, there might be a problem in transmission and reflection of the polarized light on the reflective polarization plate 127.

Increasing the area S' is enlarging the light modulation element, which leads to increase a cost and enlarge the device. Increasing the irradiation angle θ' requires using the lens 301 with a small F-number, which also leads to increase a cost and enlarge the device.

Next, a case in which the second birefringent element 24 according to the first embodiment is used is considered. In this case, in the second birefringent element 24, the ordinary beam 27a' and extraordinary beam 27b' based on the beams incident on the positions A' and B' are synthesized to be emitted as the one beam. Therefore, it is possible to inhibit the increase in area S. Since the emitted one beam includes the two beams with different polarization directions, there is no problem in transmission and reflection of the polarized light in the reflective polarization plate 118.

Second Embodiment

Next, a second embodiment is described. In the above-described first embodiment, the transmissive diffusing element is arranged between the first and second birefringent elements 22 and 24 to form the despeckler. On the other hand, in the second embodiment, a despeckler is formed of one birefringent element and a reflective diffusing element as the diffusing element.

Figure 7:
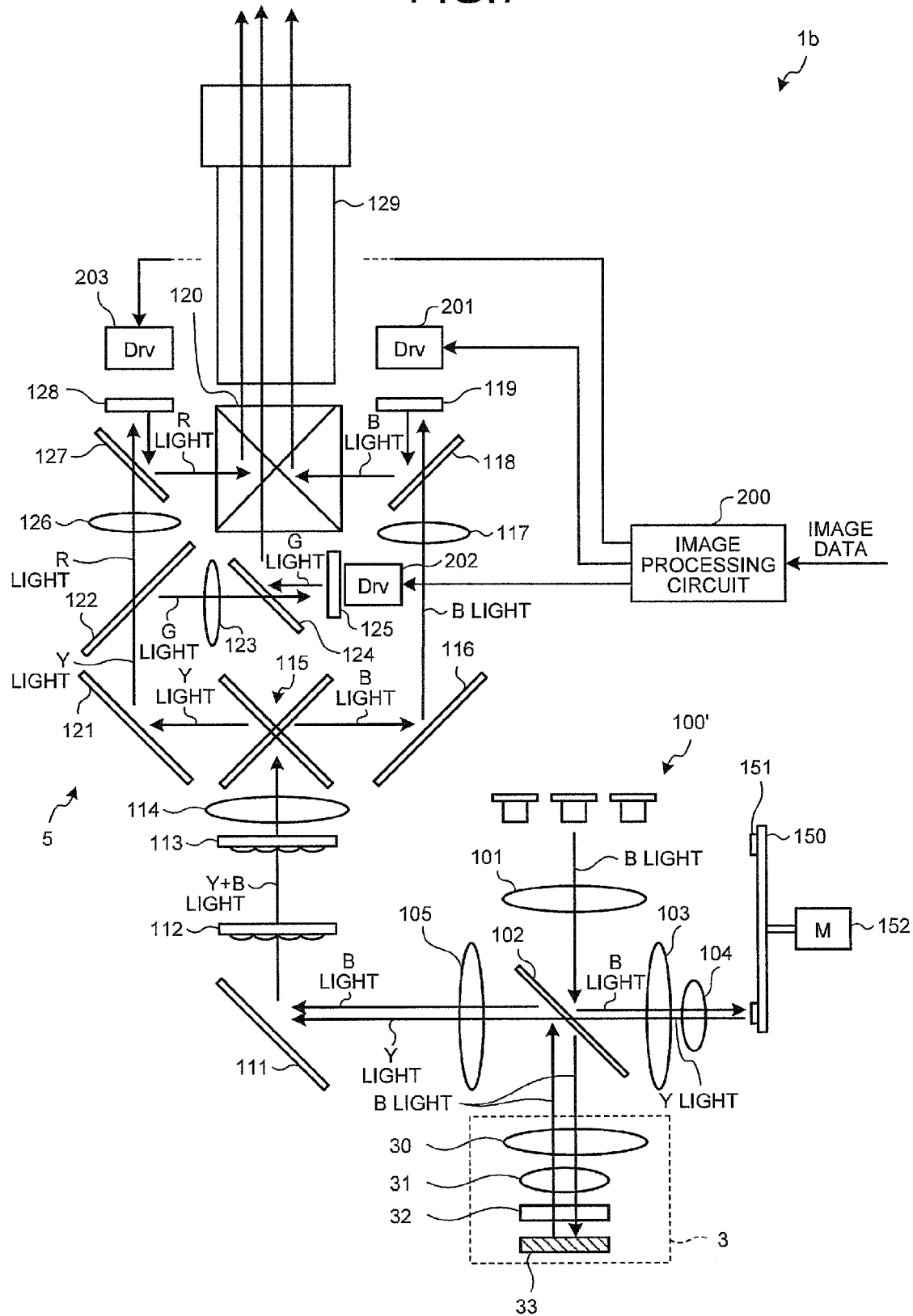
FIG. 7 is a view illustrating a configuration of an example of a projecting device applicable to a second embodiment.

FIG. 7 illustrates a configuration of an example of a projecting device applicable to the second embodiment. Meanwhile, in FIG. 7, the same reference numeral is assigned to the portion common to the above-described first embodiment and the detailed description thereof is omitted.

In FIG. 7, a projecting device 1b includes a light source 100' which emits B laser light as a light source and a rotating fluorescent substance wheel 150 on which a fluorescent substance surface 151 which emits yellow light (appropriately referred to as Y light) by irradiation of the B light is formed. The projecting device 1b irradiates the B light to the fluorescent substance surface 151 on the fluorescent substance wheel 150 to emit the Y light and separates the Y light into R light and G light. Thus, R, G, and B beams are generated by using the B laser light and the generated R, G, and B beams are irradiated to light modulation elements 128, 125, and 119 corresponding to the respective colors, respectively.

In FIG. 7, the B light emitted from the light source 100' is incident on a first surface of a dichroic mirror 102 through a condenser lens 101. The dichroic mirror 102 has a property of reflecting and transmitting part of light of a wavelength band of the B light and transmitting light of a longer wavelength band than the wavelength band of the B light (for example, red light and green light). The B light incident on the dichroic mirror 102 is reflected by the first surface of the dichroic mirror 102 to be incident on the fluorescent substance wheel 150 which is rotary-driven by a motor 152 through condenser lenses 103 and 104.

Figure 8:
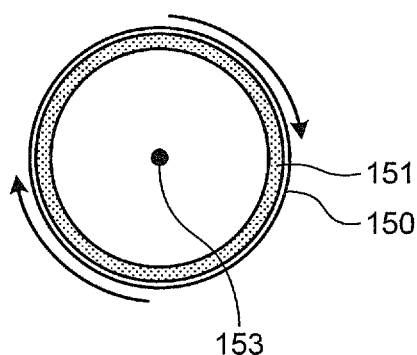
FIG. 8 is a view illustrating a configuration of an example of a fluorescent substance wheel applicable to the second embodiment.

FIG. 8 illustrates a configuration of an example of the fluorescent substance wheel 150 applicable to the second embodiment. In the fluorescent substance wheel 150 the fluorescent substance surface 151 is concentrically formed on a mirror-like surface around a rotary axis 153 and is rotated around the rotary axis 153. A fluorescent substance excited by the light of the wavelength band of the B light to emit the yellow light (Y light) is applied to the fluorescent substance surface 151. Meanwhile, since yellow is obtained by mixing green and red in an additive color system, the yellow light emitted on the fluorescent substance surface 151 includes a red component and a green component.

Herein, a diffusing element may be arranged just in front of the fluorescent substance wheel 150. Thereby, the B light is dispersedly irradiated to the fluorescent substance surface 151, so that damage by the B light of the fluorescent substance on the fluorescent substance surface 151 is inhibited and reliability of the fluorescent substance is improved. The fluorescent substance has a property that excitation efficiency is deteriorated by heat generation and the like when light density of the light irradiated thereto becomes higher than a certain value. By diffusing the B light by the diffusing element, the light density of the B light irradiated to the fluorescent substance is decreased and the excitation efficiency of the fluorescent substance may be increased.

The Y light emitted on the fluorescent substance surface 151 is transmitted through the dichroic mirror 102 to be incident on a lens 105.

On the other hand, the B light transmitted through the dichroic mirror 102 is incident on an optical device 3 according to the second embodiment. The B light is irradiated to a reflective diffusing element 33 through lenses 30 and 31 and a birefringent element 32 provided on the optical device 3 to be reflected by the diffusing element 33 and travels in an optical path opposite to the optical path at the time of incidence through the birefringent element 32 and the lenses 31 and 30 to be emitted from the optical device 3. The B light emitted from the optical device 3 is reflected by a second surface of the dichroic mirror 102 such that a traveling direction thereof is changed to the same direction as that of the Y light transmitted through the dichroic mirror 102 to be incident on the lens 105.

The Y light and B light emitted from the lens 105 are reflected by a mirror 111 such that the directions thereof are changed. The Y light and B light emitted from the mirror 111 are incident on a light separator 115 which separates the B light from the Y light through fly-eye lenses 112, 113 and a lens 114. The B light separated by the light separator 115 is emitted from the light separator 115 to be incident on a mirror 116. The Y light separated by the light separator 115 is emitted from the light separator 115 to be incident on a mirror 121.

The B light incident on the mirror 116 and reflected such that the direction thereof is changed is incident on a reflective polarization plate 118 through a lens 117. The B light transmitted through the reflective polarization plate 118 is incident on the light modulation element 119. The light modulation element 119 is driven by a driving circuit 201 according to an image signal of B color output from an image processing circuit 200 to modulate and reflect the incident light on a pixel-to-pixel basis to emit. The B light modulated by the light modulation element 119 on a pixel-to-pixel basis according to the image signal of B color is reflected by the reflective polarization plate 118 such that the direction thereof is changed and is emitted to be incident on a first surface of the light synthesizing prism 120.

The Y light separated by the light separator 115 to be incident on the mirror 121 is reflected by the mirror 121 such that the direction thereof is changed to be emitted from the mirror 121. The Y light emitted from the mirror 121 is incident on a color component separator 122, and a green light component and a red light component are separated from the Y light. For example, the color component separator 122 is formed of a dichroic mirror which reflects the light of the wavelength band of the green light and transmits the light of the wavelength band of the red light.

The G light separated from the Y light by the color component separator 122 is incident on a reflective polarization plate 124 through a lens 123. The G light is transmitted through the reflective polarization plate 124 to be incident on the light modulation element 125. The light modulation element 125 is driven by a driving circuit 202 according to an image signal of G color output from the image processing circuit 200 to modulate and reflect the incident G light on a pixel-to-pixel basis to emit. The G light emitted from the light modulation element 125 is reflected by the reflective polarization plate 124 to be incident on a second surface of the light synthesizing prism 120.

The R light separated from the Y light by the color component separator 122 is incident on a reflective polarization plate 127 through a lens 126. The R light is transmitted through the reflective polarization plate 127 to be incident on the light modulation element 128. The light modulation element 128 is driven by a driving circuit 203 according to an image signal of R color output from the image processing circuit 200 to modulate and reflect the incident R light on a pixel-to-pixel basis to emit. The R light emitted from the light modulation element 128 is reflected by the reflective polarization plate 127 to be incident on a third surface of the light synthesizing prism 120.

The light synthesizing prism 120 synthesizes the B light, G light, and R light incident on the first, second, and third surfaces, respectively, to emit from a fourth surface as a light flux. The light flux including the R light, G light, and B light emitted from the light synthesizing prism 120 is emitted outside through a projecting lens 129.

The optical device 3 according to the second embodiment is described with reference to FIGS. 9A and 9B. FIGS. 9A and 9B schematically illustrate the light passing through the optical device according to the second embodiment with reference to a cross-sectional view on a plane parallel to incident light 34 of the birefringent element 32. FIG. 9C schematically illustrates a top view of the birefringent element 32 as seen in a direction of the incident light 34.

In FIGS. 9A to 9C, the optical device according to the second embodiment is formed such that the birefringent element 32 is arranged and the reflective diffusing element 33 which diffuses and reflects the incident beam is arranged on an emission side of the incident light 34 of the birefringent element 32. An optical axis 320 of the birefringent element 32 is in a direction connecting a coordinate (1, 0) to a coordinate (0, 1) in the drawing when represented by a coordinate (x, z) by an x-axis and a z-axis.

FIG. 9A schematically illustrates the incident light 34 which passes through the birefringent element 32. The incident light 34 by the laser light (B light) is incident on the birefringent element 32. The incident light 34 is preferably incident on an incident surface of the birefringent element 32 substantially perpendicularly. Birefringence of the incident light 34 is performed on an interface on an incident side of the birefringent element 32 such that the incident light 34 is separated into an ordinary beam 35a and an extraordinary beam 35b traveling according to the optical axis 320. That is to say, a direction of the optical axis 320 corresponds to a direction of the extraordinary beam 35b which separates from the ordinary beam 35a by a separation width d when traveling by thickness t. On an interface on an emission side, the beams by the ordinary beam 35a and extraordinary beam 35b are emitted in the same traveling direction as that of the incident light 34 to be irradiated to the diffusing element 33.

FIG. 9B illustrates a state in which the beams irradiated to the diffusing element 33 are reflected by the diffusing element 33 to pass through the birefringent element 32 in the direction opposite to the direction at the time of incidence. In FIG. 9B, an ordinary beam 35a' in the birefringent element 32 is based on a component a traveling direction of which corresponds to an inverted direction of the direction of the incident light 34 out of the components of diffused light obtained by diffusing the beam by the ordinary beam 35a by the diffusing element 33. Similarly, an extraordinary beam 35b' in the birefringent element 32 is based on a component a traveling direction of which corresponds to an inverted direction of the direction of the incident light 34 out of the components of diffused light obtained by diffusing the beam by the extraordinary beam 35b by the diffusing element 33. That is to say, it is also possible to describe that a direction of the optical axis 320 corresponds to a direction of the extraordinary beam 35b' which approaches the ordinary beam 35a' by a distance equivalent to the separation width d when traveling by the thickness t. The ordinary beam 35a' and extraordinary beam 35b' are synthesized on the interface on the emission side of the birefringent element 32 to be emitted as one emission light 34'.

Herein, suppose that a surface on which the incident light 34 is incident of the birefringent element 32 is the incident surface and a surface from which the ordinary beam 35a and extraordinary beam 35b based on the incident light 34 are emitted is an emission surface. The beams emitted from the emission surface of the birefringent element 32 are diffused to be reflected by the reflective diffusing element 33 to be incident on the emission surface of the birefringent element 32. When the birefringent element 32 as seen from an incident surface side and the birefringent element 32 as seen from an emission surface side are regarded as first and second birefringent elements, respectively, the condition of arrangement of the first and second birefringent elements 22 and 24 according to the above-described first embodiment may also be applied to the second embodiment.

Next, polarization of the beams is considered. Meanwhile, in FIGS. 9A and 9B, "● (black circle)" and a left right arrow perpendicularly intersecting with an optical path indicate linear polarization with different polarization directions, for example, and a left right arrow obliquely intersecting with the optical path indicates polarization in an arbitrary direction. Suppose that the incident light 34 is linearly polarized light with an arbitrary polarization direction 321 as indicated by a left right oblique arrow in FIG. 9C. In this case, the ordinary beam 35a in the birefringent element 32 becomes the linearly polarized light with a first polarization direction according to the optical axis 320 and the extraordinary beam 35b becomes the linearly polarized light with a second polarization direction different from the first polarization direction.

The beams by the ordinary beam 35a and extraordinary beam 35b are reflected by the diffusing element 33 and the reflected lights are incident on the emission surface side of the birefringent element 32 with the polarization directions maintained. That is to say, the reflected light is incident on the birefringent element 32 in the direction opposite to that of the incident light 34. Therefore, a polarization direction of the ordinary beam 35a' separated from the reflected light by the ordinary beam 35a is the same as the polarization direction by the ordinary beam 35a. Similarly, a polarization direction of the extraordinary beam 35b' separated from the reflected light by the extraordinary beam 35b is the same as the polarization direction by the extraordinary beam 35b. Therefore, the emission light 34' obtained by synthesizing the ordinary beam 35a' and extraordinary beam 35b' emitted from the incident surface side of the birefringent element 32 becomes a beam including the two linearly polarized lights with different polarization directions. Thus, it becomes possible to sort the beams using the reflective polarization plates 118, 124, and 127 in FIG. 7.

In this manner, according to the second embodiment also, the beams by the ordinary beam 35a and extraordinary beam 35b emitted from the birefringent element 32 are reflected by the diffusing element 33 to be incident on the birefringent element 32 at the same positions as the positions from which the beams are emitted, and the ordinary beam 35a' and extraordinary beam 35b' of the incident beams are synthesized to be emitted as one beam. Therefore, it is possible to inhibit an increase in the area S of the light source described with reference to FIG. 6.

According to the configuration of the optical device according to the second embodiment, as with the first embodiment, angular distribution of the emission light 34' is obtained by superimposing angular distribution of the laser light as the incident light 34 on angular distributions of the ordinary beam 35a and extraordinary beam 35b at two points on the diffusing element 33. Therefore, speckles are reduced and illuminance uniformity is improved in the emission light 34' as compared to the incident light 34. Since the emission light 34' is emitted as the one beam, deterioration in illumination efficiency is inhibited.

Furthermore, according to the configuration of the optical device according to the second embodiment, since the emission light 34' emitted as the one beam includes the two beams with different polarization directions, there is no problem in transmission and reflection of the polarized light in the reflective polarization plate 118. Furthermore, according to the configuration of the optical device according to the second embodiment, since the effect equivalent to that of the optical device of the first embodiment is realized by the despeckler formed of one birefringent element 32, a cost lower than that of the first embodiment may be realized.

Meanwhile, although the case in which the incident light is perpendicularly incident on the incident surface of the birefringent element is described in the first and second embodiments, also when the incident light is incident on the incident surface not perpendicularly, the effect of the present invention may be exerted as long as the incident direction of the incident light on the despeckler and the optical axis of the birefringent element on the light incident side satisfies the above-described condition and an emission direction of the emission light from the despeckler and the optical axis of the birefringent element on the light emission side also satisfies the above-described condition.

The configuration satisfying the above-described condition includes a case in which an optical path bending mirror is arranged between the first and second birefringent elements 22 and 24 for bending an optical path between the first and second birefringent elements 22 and 24 as a variation of the first embodiment.

In this case, the first and second birefringent elements 22 and 24 are not parallel to each other as illustrated in FIG. 3, the optical axes 220 and 240 are mirror-symmetrical with respect to the emission surface of the first birefringent element 22 or the incident surface of the second birefringent element 24 as a plane of mirror symmetry supposing that the emission surface from which the incident light 27 is emitted of the first birefringent element 22 is in contact with the incident surface on which the beam emitted from the diffusing element 23 (beam emitted from the bending mirror) is incident of the second birefringent element 24.

The present invention has an effect of improving the illumination uniformity of the emission light when the laser light is used as the light source.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A birefringent element unit comprising:
a first birefringent element on which coherent incident light is incident;
a transmissive diffusing element on which light emitted from the first birefringent element is incident; and
a second birefringent element on which light emitted from the transmissive diffusing element is incident, wherein
the first birefringent element separates the incident light into a plurality of lights and allows the lights to be incident on the transmissive diffusing element at different positions, and
the second birefringent element synthesizes the plurality of lights emitted from the transmissive diffusing element into one light to emit.

2. The birefringent element unit according to claim 1, wherein
the first and second birefringent elements are arranged such that an optical axis of the first birefringent element and an optical axis of the second birefringent element are in a state of mirror-symmetrical.

3. The birefringent element unit according to claim 2, wherein
in the state of mirror symmetrical, when an emission surface from which the incident light is emitted of the first birefringent element is in contact with an incident surface on which the light emitted from the transmissive diffusing element is incident of the second birefringent element, the emission surface or the incident surface corresponds to a plane of mirror symmetry.

4. A projecting device comprising:
the birefringent element unit according to claim 1;
at least one light modulation element which modulates light emitted from the birefringent element unit according to an image signal; and
a optical projection unit which emits the light modulated by the light modulation element.

5. The birefringent element unit according to claim 1, wherein,
the first birefringent element separates the incident light into an ordinary light and an extraordinary light, a polarization direction of the extraordinary light is perpendicular to a polarization direction of the ordinary light, and an optical path of the extraordinary light is different from an optical path of the ordinary light, the transmissive diffusing element diffuses, at different positions, the ordinary light and the extraordinary light incident from the first birefringent element, and the second birefringent element synthesizes, into one light to emit, the ordinary light with a component of a predetermined traveling direction among the ordinary lights diffused by the transmissive diffusing element, and the extraordinary light with a component of a predetermined traveling direction among the extraordinary lights diffused by the transmissive diffusing element.

6. An birefringent element unit comprising:

a birefringent element on which coherent incident light is incident; and a reflective diffusing element which diffuses and reflects light emitted from the birefringent element to emit such that the diffused and reflected light is incident on the birefringent element, wherein the birefringent element separates the incident light into a plurality of lights, allows the lights to be incident on the reflective diffusing element at different positions, and synthesizes reflected lights of the plurality of lights emitted from the reflective diffusing element into one light to emit.

7. The birefringent element unit according to claim 6, wherein, the birefringent element separates the incident light into an ordinary light and an extraordinary light, a polarization direction of the extraordinary light is perpendicular to a polarization direction of the ordinary light, and an optical path of the extraordinary light is different from an optical path of the ordinary light, the reflective diffusing element diffuses, at different positions, the ordinary light and the extraordinary light incident from the birefringent element, and the birefringent element synthesizes, into one light to emit, the ordinary light with a component of a predetermined traveling direction among the ordinary lights diffused by the reflective diffusing element, and the extraordinary light with a component of a predetermined traveling direction among the extraordinary lights diffused by the reflective diffusing element.

* * * * *